Oct. 30, 1928.
J. W. SMALL
1,689,214
AUTOMOBILE WINDSHIELD WIPER
Filed March 12, 1924  2 Sheets-Sheet 1
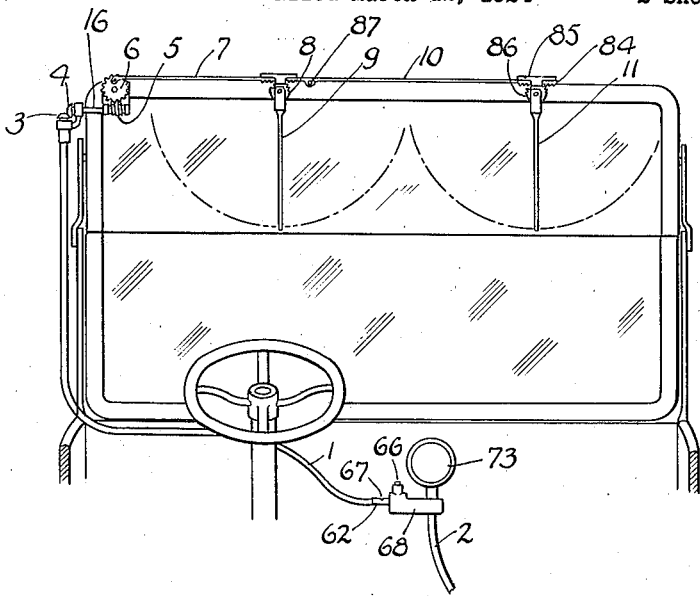
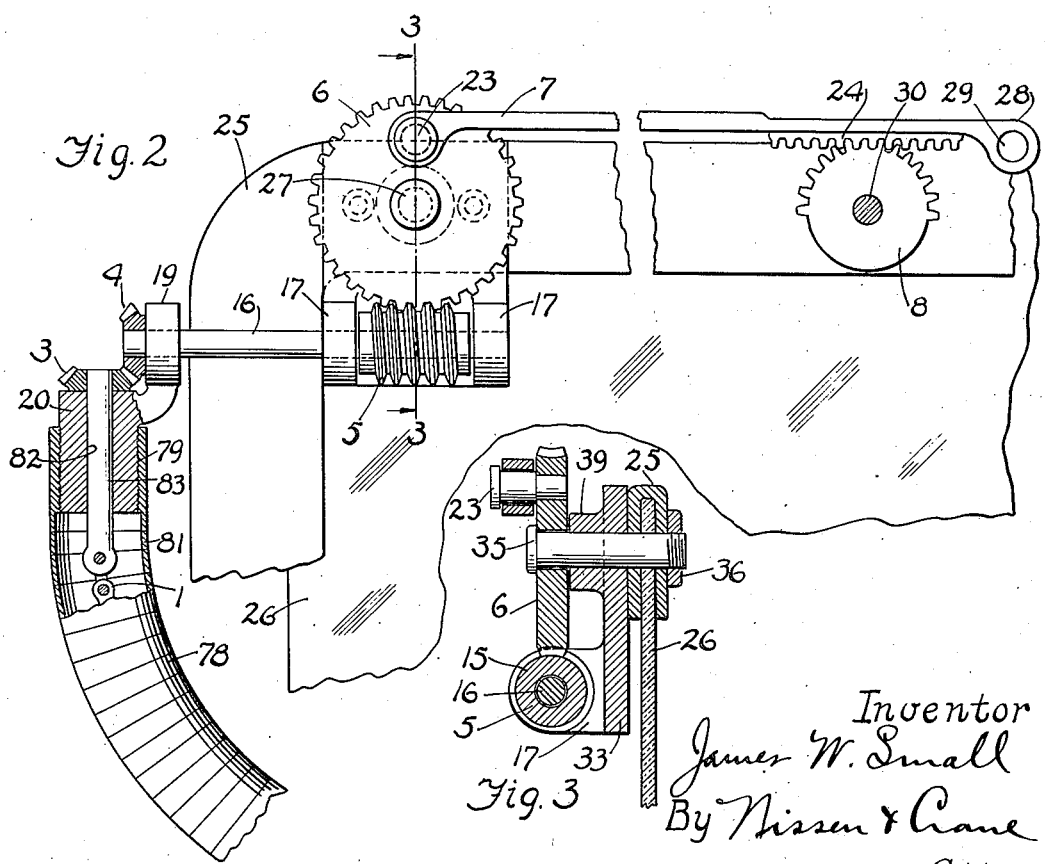
Inventor
James W. Small
By Nissen & Crane
Attys.

Oct. 30, 1928.
J. W. SMALL
1,689,214
AUTOMOBILE WINDSHIELD WIPER
Filed March 12, 1924   2 Sheets-Sheet 2
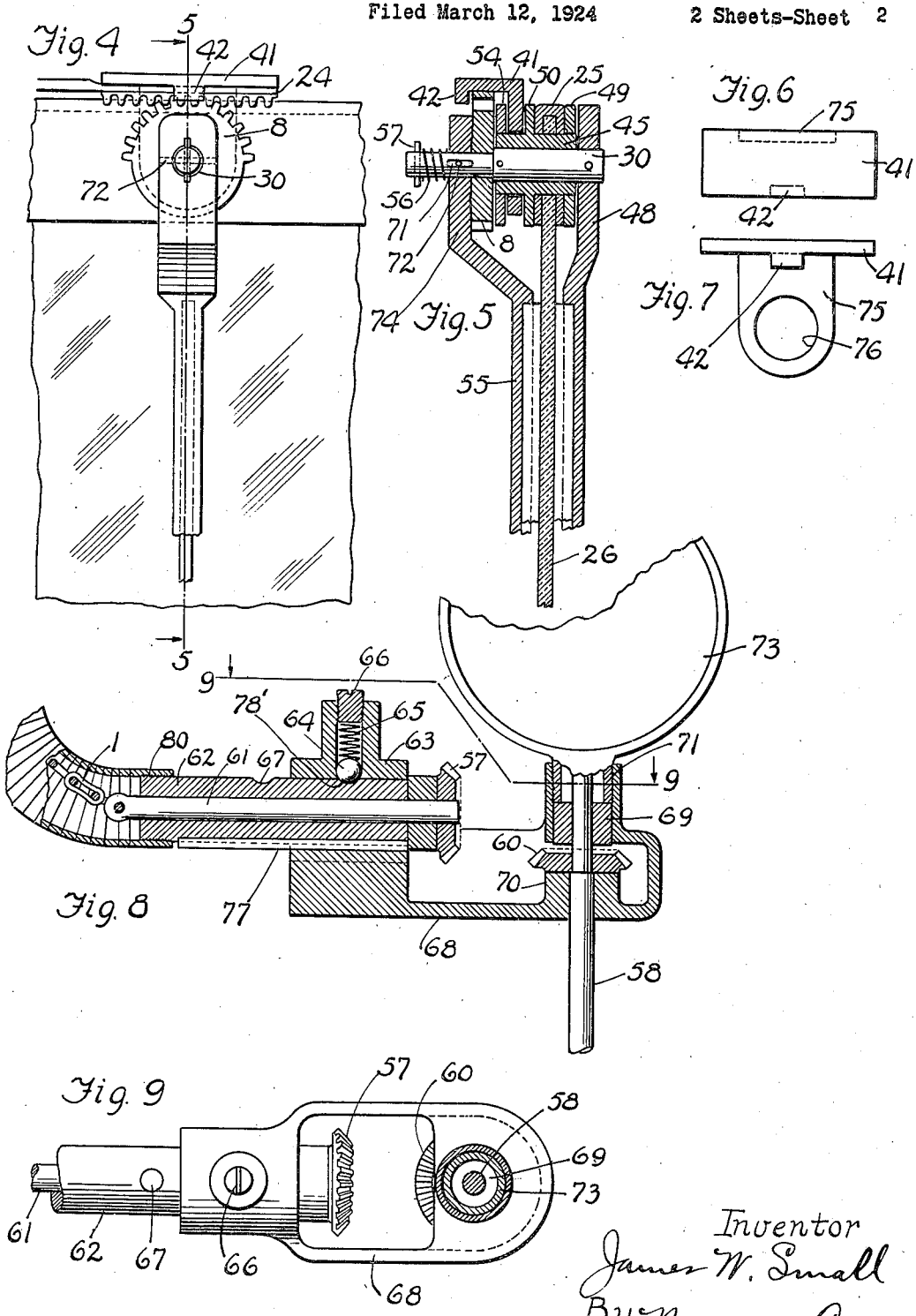

Patented Oct. 30, 1928.

1,689,214

UNITED STATES PATENT OFFICE.

JAMES W. SMALL, OF CHICAGO, ILLINOIS.

AUTOMOBILE WINDSHIELD WIPER.

Application filed March 12, 1924. Serial No. 698,598.

This invention relates to window cleaning devices which are especially adapted to remove rain, sleet, snow and condensed moisture from the wind shield of an automobile or any other vehicle, and one of its objects is the provision of improved wind shield cleaning mechanism adapted to be attached to and driven by the ordinary speedometer shaft of an automobile or other power driven vehicle.

Another object of this invention is to provide an automatically governed window wiper that will develop an increase in its speed and an increase in its number of wiping strokes as the machine increases in speed of travel, thus to rapidly remove the increased deposit of snow, rain or moisture that accumulates due to the increase in speed of the vehicle.

Another object is to provide a wind shield wiper that will be set in motion at the instant the vehicle is started and that will cease motion when the vehicle stops by means of mechanism which includes only a single flexible shaft connected to some driven part of the automobile.

A further object of the invention is to provide a wind shield wiper of ample strength, and at the same time, of such construction that in no position will it deprive the operator of an appreciable portion of his view of the road.

Another object of the invention is to provide a wind shield wiper that may be attached to a wind shield in such a manner as to allow the same to be set at any desired angle.

It is also the object of this invention to provide a wind shield wiper that may be operated by hand from the inside of the vehicle for the purpose of removing from the both sides of the wind shield, the moisture that accumulates while the vehicle is not in motion.

A further object is to provide a power-operated wind shield wiper, controllable at the will of the operator.

Other objects of the invention will appear hereinafter, the novel features and combinations being set forth in the appended claims.

Referring to the accompanying drawings,
Fig. 1 is a perspective view of my improved wind shield wiper connected to a speedometer of an automobile;

Fig. 2 is in part a sectional view showing the bevel gear driven by the flexible shaft in mesh with the bevel gear that drives the worm, and in part an elevation view showing the connections between the worm, worm gear, rack and the pinion;

Fig. 3 is a sectional view taken on line 3—3 of Fig. 2 looking in the direction of the arrows;

Fig. 4 is an elevational view showing the rack in mesh with the pinion that drives the wiper;

Fig. 5 is a sectional view taken on the line 5—5 of Fig. 4 looking in the direction of the arrows;

Fig. 6 is a top plan view of a guide;

Fig. 7 is an elevational view of the guide shown in Fig. 6;

Fig. 8 is a sectional view showing the connection to the speedometer shaft; and

Fig. 9 is a plan view partly in section on line 9—9 of Fig. 8.

As shown in Fig. 1, the flexible shaft 1 is connected to the flexible shaft 2 of the speedometer 73. A bevel gear 3 at the end of the flexible shaft 1 is in mesh with a bevel gear 4 connected by a short shaft 16 to the worm 5. The worm gear 6 in mesh with the worm 5 transmits motion to an eccentrically pivoted connecting rod 7, the extreme end of which is formed and cut to function as a rack. The rack on the connecting rod meshes with the pinion 8 to which the window wiper or squeegee 9 is attached. A second connecting rod 10, differing from the connecting rod 7 in length, operates a second window wiper or squeegee 11 in tandem with the wiper or squeegee 9.

In Fig. 2 is shown the means for transmitting motion from the flexible shaft 1 to the oscillating pinion 8. The bevel gear 3 secured to the flexible shaft 1 is in mesh with the bevel gear 4 which is keyed to the shaft 16. The shaft 16 is supported by bearings 17, 17 and 19, the latter being mounted on the bearing 20 of the flexible shaft 1 while the two former bearings 17, 17 are mounted on the plate 33, as shown in Fig. 3.

The worm 5 is keyed to the shaft 16 and located between the bearings 17, 17. Meshed with the worm 5 is the worm gear 6 which rotates about the pin 27 that passes through the metal framework 25 of the wind shield and through the plate glass 26 that is held by the framework. Eccentrically pivoted on worm gear 6 by a stud 23 is a connecting rod 7 which is provided at its end remote from the pivot 23 with a rack 24 which terminates with an enlarged knuckle 28 provided with a hole 29. The teeth of the pinion 8 which is mounted on the pin 30, are meshed with the teeth of the rack 24.

Fig. 3 shows the glass 26 held in the metal framework 25 to which the plate or bearing mounting 33 and the worm gear 6 are bolted by a bolt 35 and nut 36. The worm 5 is in mesh with the worm gear 6 to which is secured the stud bearing 23. The gear 6 rests against the hub 39 and is journaled on the bearing 35.

By reference to Fig. 4 it will be seen that the rack 24 is restrained from vertical movement by the guide 41 and is restrained from horizontal movement by the flange 42 of the guide 41. Thus the teeth of the rack 24 are held in mesh with the teeth of the pinion 8 which is keyed to the shaft 30. By reference to Fig. 5 in connection with Fig. 4 it will be seen that the shaft 30 rotates in the bushing 45 which extends through the glass 26 and the frame 25. On the outside of the glass the wiper or squeegee 48 is rigidly pinned to the shaft 30 being separated from the framework 25 by a threaded washer 49 which screws onto the bushing 45 and holds said bushing in place by being secured to the framework 25. A flange 50 integral with the bushing 45 rests against the inside of the metal frame 25; thus making possible a tight compressive fit between the bushing 45 and the frame 25.

The guide 41 fits loosely on the bushing 45 so as to allow it to rock to and fro or oscillate as the pin 23 of Fig. 2 changes in elevation from the top to the bottom of its course. The guide 41 is equipped with a flange 42 which serves to keep the pinion 8 in place, and is separated from the pinion 8 by a washer 54 that fits over the bushing 45. The inside wiper or squeegee 55 is mounted on and secured to the shaft 30 by means of the pin 72 and the slot 71 and is driven by friction from the lateral surface of the pinion 8. The outside wiper or squeegee 48 is keyed to and driven by the shaft 30 which is oscillated by the pinion 8 through its frictional engagement with the wiper arm 74 and the pin and slot connection between the latter and the shaft 30. Movements imparted to the arm 74 by the gear 8 will be imparted to the shaft 30 by reason of the cross pin 72. Frictional driving engagement between the surface of the pinion 8 and the surface of the wiper arm 74 is maintained by the spring 56 which is held in place by the cotter pin 57.

Figs. 6 and 7 show respectively the plan and elevational views of the guide 41 of Fig. 5. This guide comprises a vertical plate 75 which is provided with a hole 76 slightly larger in diameter than the bushing 45 of Fig. 5 in order that the guide may be loosely journaled on the bushing 45.

Fig. 8 illustrates the means for transmitting motion from the rigid shaft 58 of the speedometer to the flexible shaft 1 of the wind shield wiper operating mechanism. This means comprises the bevel gears 57 and 60 which are secured to their respective rigid shafts 61 and 58. The shaft 61 rotates in a sleeve 62 which is splined, as shown in Fig. 8, at 77 to the collar 63 for sliding movement therein. The collar 63 is provided with a ball clutch 64, the sleeve 62 being recessed at 67 and 78' spaced apart along the upper surface of the sleeve 62. The ball 64 is held in contact with the sleeve by means of the compression spring 65, the tension of which may be adjusted by means of the set screw 66. In the position shown the gears 57, 60 would not mesh, but by advancing the sleeve 62 to a position such that the ball 64 would rest in the recess 67, the gears would thus be caused to mesh so that an operating connection to the speedometer shaft may be obtained at will. The housing 68 constructed to admit the shaft 58 and to supply the collar 63 is equipped with the bushing 69 and the bearing 70 through which the shaft 58 passes; the housing 68 is also provided with a collar 71 into which fits the speedometer 73.

A flexible tube 78 equipped at each end with means 80 and 79 provided for attachment to the sleeve 62 and to the bearing 20, respectively, surrounds and protects the flexible shaft 1. The flexible tube 78 comprises a wall 81 formed by a continuous spirally twisted strip of metal adapted on its lateral edges to flexibly connect successive turns of said spiral together and the rigid means for attachment 80 and 79. The tube 78 and the shaft 1 are supported from above by the short shaft 16 by means of a bearing 19 journaled on shaft 16 and restricted from sliding off said shaft by the bevel gear 4; and from below by the sleeve 62 which is securely held in the collar 63. The bearing bracket 20 comprises attachment means 79 provided to support the flexible tube 78, bearing means having an opening 82 in which the short shaft 83 is journaled and bearing means 19 journaled on the short shaft 16 forming a suspension support for the flexible shaft 1 and the flexible tube 78 and causing contact to exist between the teeth of the bevel gears 3 and 4.

A second wiping device 11 is detachably connected to the operating means of the wiping device 9 and is operated by mechanism similar to that described and associated with wiper 9. A connecting rod 10 pivotally attached to the connecting rod 7 at 87 of Fig. 1 provided at its extreme end remote from the pivoted end with a rack 84 and held in place by a guide 85, oscillates a pinion 86 which in turn oscillates the wiper or squeegee 11.

The guides 41 and 85 are loosely journaled on their respective bearings and the connecting rods 7 and 10 are pivotally joined together at 87 of Fig. 1 so as to permit the rocking or oscillating movement created by the change in elevation of the ends of the connecting rods caused by the eccentric nature of the mechanism. When the worm gear 6 rotates the end of the connecting rod 7 attached to it suffers a change in elevation; when lowered the opposite end of the same is raised along with the end of the connecting rod 10 which is pivoted to it; thus the rack end of the connecting rod 10 is lowered causing its guide 85 to tilt one way while the guide 41 of Fig. 5 tilts the other.

The invention provides a means for detachably connecting the flexible shaft 1 to the speedometer shaft 2 so as to transmit power to the wiping mechanism at the will of the operator. A rotary motion is transmitted from the speedometer 73 through the flexible shaft 1 to the worm 5 which is meshed with a worm gear 6 by means of the shaft 16 and the bevel gears 3 and 4. By means of the stud bearing 23 secured to the worm gear 6 and the connecting rod 7 the rotary motion is converted into an oscillating motion and is transmitted to the wiper or squeegee 9 by the pinion 8; a friction driving connection being used between the pinion 8 and the wiper or squeegee 9 so as to make possible manipulation of the squeegee or wiper by the operator from within while the gear 6 is not in motion. The oscillating movement is further transmitted to a second wiper 11 provided to clean other portions of the wind shield by the connecting rod 10 and the pinion 86; a friction driving connection identical with that associated with the wiper or squeegee 9 being used to transmit an oscillating movement from the pinion 86 to the wiper or squeegee 11; thus the mechanism permits manipulation of all squeegees by the operator from within while the vehicle is not in motion. A pivotal attachment at 19 of the flexible shaft 1 to the short shaft 16 is provided so as to allow the wind shield to be set at any angle without affecting the operation of the wiper. That is to say, the bearing 19 is pivotally suspended on the horizontal shaft 16. Therefore, since the shaft 1 and tube 78 are flexible, the tiltable section of the windshield may be adjusted to any desired angle without interfering with the operation of the windshield wiper. It should also be noted that the pivotally suspended bearing 19 is rigidly connected to the upright bearing 20 and these bearings confine and hold the beveled gears 3 and 4 in mesh with each other.

In my divisional application, Serial No. 262,379, filed March 17, 1928, I have described and claimed the power take-off or drive for the wind-shield wiper, as illustrated in Figs. 1, 8 and 9 of this application.

Obviously those skilled in the art may make various changes in the details and arrangement of the parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In mechanism for wiping wind shields, an actuating bar extending longitudinally of the wind-shield, means at one end of said bar for reciprocating it, a pivotally mounted wiper arm, a pinion on the pivot of the wiper arm frictionally engaging said wiper arm, and operating connections between said bar and said pinion to effect the oscillation of said wiper arm through said frictional engagement with the pinion, the latter permitting manual oscillation of the wiper arm independently of said operating connections.

2. In mechanism for wiping wind shields, a bar extending from one upper corner of said frame to the middle portion thereof, a wiper arm, a pivotal support for said wiper operatively connected to said bar, and a frictional connection between said wiper and said pivotal support permitting independent manual manipulation of said wiper.

3. In mechanism for cleaning wind shields, the combination with a wiper arm, of means for supporting the same for pivotal oscillation, a pinion on said pivot frictionally engaging said wiper, an operating rack meshing with said pinion, a guide frame for said rack bar cradled on said support to oscillate during the reciprocation of said rack bar, and means comprising a rotating member eccentrically connected to said rack bar for reciprocating the latter.

4. In mechanism for wiping wind shields, the combination with a plurality of wipers mounted in spaced relation on a wind shield and intermediate the ends thereof, and means for operating all of the said wipers in tandem from a single source of power, comprising a pair of reciprocating rack bars, pinions operatively connected to the wipers and actuated by said bars, operating means common to both rack bars located at one corner of the windshield.

5. In multiple wiping mechanism for wind shields, the combination with a plurality of wipers mounted in spaced-apart positions and spaced from the ends of the wind shield, means for operating all the wipers in tandem from a single source of power, a pair of reciprocating rack bars, pinions operatively connected to the wipers and actuated by said bars and a detachable connection between said bars for cutting off one of the wipers from being operated by said operating means.

6. In mechanism for wiping wind shields, the combination with operating mechanism, of a pivotally mounted wiper arm, and a frictional driving connection including a clutch member entirely flat in a single plane between said operating mechanism and said wiper arm to permit direct manual operation of said wiper when desired independently of said operating mechanism whether the latter is operating or not.

7. In wind shield wiping mechanism, a wiper arm, means for pivotally supporting said wiper arm, a pinion concentrical with said wiper arm and connected to said wiper for oscillating the same, a rack bar meshing with said pinion and extending along the upper frame of the wind shield, a rotating driving device at one corner of the wind shield and eccentrically connected to said rack bar, and a tiltable guide for said rack bar to hold the same in mesh with said gear.

8. In wind shield wiping mechanism the combination with a journal bearing secured to the upper frame of the wind shield, a rock shaft journaled in said bearing, wipers connected to said rock shaft to move therewith on opposite sides of the glass of the wind shield, a driving gear connected to said rock shaft, yieldable means for holding one of said wiper arms in frictional engagement with said driving gear, a rack bar in mesh with said driving gear, a rotating driving device eccentrically connected to said rack bar, and a retaining guiding device for said rack bar pivotally mounted on said journal bearing and confined thereto to tilt on the axis of said rock shaft during the reciprocations of said rack bar.

9. In a wind-shield wiper for automobiles, a pair of wiper arms, means for moving said arms over the wind-shield comprising a source of power common to both of said arms and a frictional drive between said power source and each of said wiper arms permitting said wiper arms to be independently manually manipulated.

In testimony whereof I have signed my name to this specification on this 6th day of March, A. D. 1924.

JAMES W. SMALL.